United States Patent Office 3,395,102
Patented July 30, 1968

3,395,102
PROCESS AND ANTIFOAMING
AQUEOUS SYSTEMS
Keith Leyshon, Cardiff, Glamorgan, and Kenneth Graham Cooper, Dinas Powis, Glamorgan, Wales, assignors to Midland Silicones Limited, Reading, England
No Drawing. Filed June 10, 1965, Ser. No. 463,051
Claims priority, application Great Britain, June 18, 1964, 25,233/64
8 Claims. (Cl. 252—321)

ABSTRACT OF THE DISCLOSURE

A method for suppressing foaming in aqueous systems based on the use of certain aminoalkylhydrocarbylsiloxane polymers and polyaminoalkylhydrocarbylsiloxane polymers. The siloxane polymers may be utilized per se or in admixture with a finely divided silica filler.

This invention relates to a method for the suppression of foaming in aqueous media and also relates to novel antifoaming systems.

Organopolysiloxane-based antifoam compositions are now well known in the art and have found widespread application in many fields, for example in vat dyeing and in the preparation of pharmaceuticals by fermentation, where their defoaming properties have proved highly beneficial. As far as is known such compositions have been based almost exclusively on organopolysiloxanes in which the silicon-bonded organic groups have comprised hydrocarbon radicals, particularly methyl radicals. Although the methylpolysiloxanes are readily available materials and for the most part exhibit satisfactory antifoaming properties, there are many applications where it is desirable to maintain the level of added antifoam compositions at the lowest possible value. There has further existed a need for an organosilicon-based antifoam which can achieve satisfactory defoaming of aqueous and other media at a comparatively lower cost than the presently employed compositions.

The object of the present invention is to introduce a novel polymeric siloxane as an antifoaming agent. A non-foaming aqueous system is also an object. A further object is a highly efficient siloxane polymer antifoam agent. Other objects and advantages are detailed in or will be apparent from the disclosure and claims.

We have now found that aminoalkyl-substituted and polyamino(alkyl)-substituted organopolysiloxanes and their organic acid salts are efficient deformers for aqueous systems. We have also found that many of the organopolysiloxanes are considerably more efficient in their defoaming activity than the dimethylpolysiloxanes.

This invention provides a process for the suppression of foaming in an aqueous medium which comprises dispersing in the aqueous medium (1) a fluid organopolysiloxane in which at least one of the silicon-bonded organic substituents is an aminoalkyl radical of the general formula —R'NH$_2$ or a polyaminoalkyl radical of the general formula —R'Z, wherein R' represents a divalent aliphatic hydrocarbon radical and Z is a monovalent radical which is composed of carbon, nitrogen and hydrogen atoms and contains at least two amine groups and which is attached to R' by a carbon-nitrogen bond, or (2) an organic acid salt of (1).

The organopolysiloxanes employed according to the process of this invention are substantially linear polymers and vary in consistency from free-flowing liquids to highly viscous gum-like materials. The preferred organosiloxane polymers are those which are represented by the general unit formula

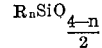

wherein $n$ has an average value of from 1.9 to 2.1 and wherein at least some of the R groups are aminoalkyl radicals or polyaminoalkyl radicals, any remaining R groups being monovalent hydrocarbon radicals. In the organopolysiloxanes employed in this invention at least some of the silicon-bonded substituents R must be radicals of the general formula —R'NH$_2$ or of the formula —R'Z wherein R' represents a divalent aliphatic hydrocarbon radical such that the nitrogen atom in the radical —R'NH$_2$ or the Z group in the radical —R'Z are separated from the silicon atom by at least 3 carbon atoms. In the radical —R'Z the symbol Z denotes a monovalent radical linked to R' through a carbon to nitrogen bond, said monovalent radical consisting of carbon, nitrogen and hydrogen atoms and containing at least two amino groups. Examples of operative substituents therefore are γ-aminopropyl and δ-aminobutyl radicals and the radicals denoted by the formulae —(CH$_2$)$_3$NHCH$_2$CH$_2$NH$_2$, —(CH$_2$)$_4$NHCH$_2$CH$_2$NH$_2$ and

The monovalent hydrocarbon radicals represented by R can be alkyl radicals such as methyl, ethyl, propyl and C$_x$H$_{2x+1}$, where $x$ is an integer preferably not exceeding 30, aryl radicals such as phenyl, alkaryl radicals such as ethylphenyl, aralkyl radicals such as phenylethyl, alkenyl radicals such as vinyl, allyl, butenyl and —C$_x$H$_{2x}$, as well as cycloaliphatic radicals.

Preferred as the operative organopolysiloxanes are the copolymers comprising dihydrocarbyl substituted siloxane units and units of the formula R"R'"SiO wherein R" represents a hydrocarbyl radical and R'" represents the defined aminoalkyl or polyaminoalkyl radicals. Examples of the preferred organopolysiloxanes therefore are copolymers of dimethylsiloxane units with δ-aminobutylmethylsiloxane units or γ-aminopropylmethyl siloxane units, copolymers of methylvinylsiloxane units and methyl(N-beta-aminoethyl - gamma-aminopropyl)siloxane units and copolymers of dimethylsiloxane with methyl-(N-beta-amino-ethyl-gamma-amino-isobutylsiloxane). If desired the polymers or copolymers can be end-stopped with R$_3$SiO$_{1/2}$ units, for example triorganosiloxy units such as trimethylsiloxy, dimethylvinylsiloxy and dimethyl-γ-aminopropylsiloxy units.

Particularly preferred from cost considerations are those organopolysiloxanes containing from about 1 to about 15 of the defined amino-substituted radicals per 100 silicon atoms. Polymers or copolymers containing up to 25 or more of the amino substituted radicals per 100 silicon atoms can be employed if desired but no significant increase in efficiency is apparent with this larger content of the amino substituent.

The organic acid salts of the amino substituted organopolysiloxanes can also be employed in the suppression of foaming according to the process of this invention. The operative organosiloxane salts can be obtained by the reaction of the amino-substituted organopolysiloxanes defined above with the appropriate organic acid, for example acetic acid or dichloroacetic acid. In most cases the salt-forming reaction between the amino group and the organic acid occurs simply by mixing the reactants although the application of heat may be required in some instances.

The process of this invention is applicable in the prevention or reduction of foaming in aqueous media and in order to facilitate the dispersion of these organopolysiloxanes or their salts in the said aqueous media they can, if desired, be emulsified prior to use.

Although the organopolysiloxanes or salts per se can be used as defoaming agents we have found that their efficiency in this application, particularly in non-ionic and cationic media, can be considerably improved if a finely divided silica is dispersed in the amino-substituted polysiloxane prior to use. In a preferred embodiment therefore the present invention comprises a novel antifoam composition comprising a mixture of the hereinbefore defined amino-substituted siloxanes or their organic acid salts with a finely divided silica. The quantity of silica employed in the antifoam composition of the invention is not critical but preferably lies within the range from 1 to 15% by weight based on the weight of the amino-substituted polysiloxane or salt.

The finely-divided silica can be dispersed in the polysiloxane component by a simple mixing technique. The dispersion as prepared in this manner exhibits good stability on storage. If desired, the stability on storage can be improved by heating the dispersion in the range of about 80°–150° C. for a period of from about 20 to about 120 minutes.

The defoaming agents according to this invention can vary from free-flowing to viscuos liquids in the case of the amino-substituted polymers or can range from a viscous liquid to a paste-like material in the case of the polysiloxane/silica mixture. For some applications it may be desirable to improve the dispersibility of the defoaming agent in the medium to be defoamed. In such cases the polysiloxane or the polysiloxane/silica paste can be emulsified prior to use.

The quantity of defoaming agent required to bring about a satisfactory reduction in the foaming of any particular medium will depend among other things upon the nature of the foaming medium. For most applications however, between about 100 and 5000 parts by weight of the defoaming agent for every million parts of the foaming medium can be effectively employed although instances may occur when greater or lesser quantities may be preferred.

The following examples illustrate the invention.

EXAMPLE 1

A siloxane copolymer comprising 95 mole percent of dimethylsiloxane units and 5 mole percent of methyl-($\gamma$-aminopropyl)siloxane units was prepared by the steps of reacting allylamine with methyldiethoxysilane and thereafter equilibrating the hydrolysis reaction product of this silane with cyclic dimethylsiloxanes and hexamethyldisiloxane to produce the desired trimethylsilyl end-stopped copolymer which was a clear liquid having a viscosity of 1500 cps. when measured at 25° C.

A 10% by weight solution of the copolymer in neutral mineral spirits was prepared and a series of test solutions made up, each solution comprising a quantity of the copolymer well dispersed in 200 ml. of a 0.1% by weight aqueous solution of the sodium salt of the condensation product of oleic acid and methyl taurine. Each of the test solutions was then aerated by means of a dynamic foaming jig.

It was found that when the test solution contained the equivalent of 3000 parts by weight of the copolymer per one million parts of the test solution, foaming of the test solution could be suppressed for five minutes.

EXAMPLE 2

A trimethylsilyl end-stopped siloxane copolymer comprising 95 mol percent of dimethylsiloxane units and 5 mol percent of methyl(N-beta-aminoethyl-gamma-aminoisobutyl)siloxane, i.e.

units was prepared by the hydrolysis of the compound methyl(N-beta - aminoethyl - gamma - aminoisobutyl)diethoxysilane and equilibration of the hydrolysis product with octamethyl-cyclotetrasiloxane and decamethyltetrasiloxane. The copolymer was a clear liquid having a viscosity of 750 cps. when measured at 25° C.

The defoaming properties of the copolymer were tested by the method described in Example 1 and it was found that 2500 parts by weight of the copolymer per one million parts of test solution was required to suppress foaming for 5 minutes under the test conditions.

EXAMPLE 3

475 g. of the copolymer of methyl(gamma-aminopropyl)siloxane and dimethylsiloxane employed in Example 1 was mixed thoroughly with 25 g. of a finely divided fume silica having a surface area of 380 m.²/g., the mixture thereafter being heated at a temperature of 80° C. for one hour with continued stirring. On cooling a paste was obtained. The defoaming efficiency of this paste was measured by preparing a 10% by weight dispersion of the paste in neutral mineral spirit and proceeding as described in Example 1. In the present example the defoaming efficiency was tested in connection with the sodium salt of the condensation product of oleic acid and methyl taurine (designated A) employed previously and was additionally tested with sorbitan monooleate (B) and (C) a fatty acid alkylpolyoxyethylene substituted tertiary amine as the foam promoters.

The results obtained were as follows:

| | Defoaming efficiency (p.p.m.) | |
|---|---|---|
| A | 1250 | (5000+) |
| B | 100 | (600) |
| C | 4000 | (5000) |

For comparative purposes these tests were applied to an antifoam composition comprising a paste of a dimethylpolysiloxane having a viscosity of about 3000 cps. at 25° C. and containing about 6% by weight of a finely-divided silica. The comparative results are shown in parentheses in the table above.

EXAMPLE 4

The copolymer containing 5 mol percent methyl-(gamma-aminopropyl)siloxane described in Example 1 was emulsified in sufficient water to provide an emulsion containing 10% by weight of the copolymer. Several test solutions were prepared containing different quantities of the emulsion dispersed in an aqueous solution containing 0.1 percent by weight of the sodium salt of the condensation product of oleic acid and methyl taurine. These dispersions were then aerated in turn and caused to foam as described in Example 1. It was found that foaming under these conditions was suppressed for 5 minutes in the test solution that contained 2500 parts of the emulsified copolymers for every one million parts of the solution.

EXAMPLE 5

A siloxane copolymer comprising 90 mole percent of dimethylsiloxane units and 10 mole percent of methyl($\gamma$-aminopropyl)siloxane units was prepared in a manner similar to that employed for the preparation of the copolymer described in Example 1. The copolymer had a viscosity of 5700 cps. at 25° C.

When its defoaming properties were tested according to the method described in Example 1 it was found that foaming of the test solution could be suppressed for 5 minutes when it contained 1000 parts of the copolymer for every one million parts of the solution.

EXAMPLE 6

In a manner similar to that described in Example 1 a siloxane copolymer having a viscosity at 25° C. of 1250 cps. and comprising 75 mole percent of dimethylsiloxane units and 25 mole percent of methyl($\gamma$-aminopropyl)- siloxane units was prepared and its defoaming efficiency tested. It was found that 900 parts by weight of the copolymer were required for every one million parts of the test solution to suppress foaming for five minutes.

EXAMPLE 7

The experiment of Example 3 was repeated employing a paste prepared from 430 g. of the copolymer and 70 g. of a finely divided silica filler.
The test results obtained were as follows:

|   | Defoaming efficiency (p.p.m.) |
|---|---|
| A | 1,000 |
| B | 50 |
| C | 2,500 |

That which is claimed is:
1. A process for the suppression of foaming in an aqueous medium which comprises combining (a) 1 to 15 parts by weight of a finely divided silica filler with (b) 100 parts by weight of a fluid organopolysiloxane of the general unit formula $$R_n SiO_{\frac{4-n}{2}}$$

wherein $n$ has an average value of 1.9 to 2.1, each R is a monovalent substituent containing from 1 to 30 carbon atoms and selected from the group consisting of hydrocarbon radicals and radicals of the formula —R'NH$_2$ and —R'Z wherein R' represents a divalent aliphatic hydrocarbon radical and Z is a monovalent radical composed of carbon, nitrogen and hydrogen atoms containing at least two amine groups and attached to R' through a carbon-nitrogen linkage, the Z group and the NH$_2$ group being separated from the silicon atom by at least 3 carbon atoms, there being a total of from 1 to 25 of said —R'NH$_2$ and —R'Z radicals per 100 silicon atoms in said organopolysiloxane, or (c) an acetic acid or dichloroacetic acid salt of the organopolysiloxane (b), and dispersing the silica and the fluid organopolysiloxane or its acid salt in the aqueous medium.

2. A process as claimed in claim 1 wherein the amino-alkyl substituent is the γ-aminopropyl radical or the δ-aminobutyl radical.

3. A process as claimed in claim 1 wherein the polyaminoalkyl substituent is the

—CH$_2$CH$_2$CH$_2$NHCH$_2$CH$_2$NH$_2$ radical.

4. A process as claimed in claim 1 wherein the copolymeric organopolysiloxane is end-stopped with trimethylsiloxy units.

5. A process as claimed in claim 1 wherein the organopolysiloxane or its organic acid salt is employed in a quantity of from 100 to 5000 parts by weight for every million parts of the aqueous medium.

6. A process as claimed in claim 1 wherein the organopolysiloxane is a copolymer of dihydrocarbon-substituted siloxane units and R″R‴ SiO units wherein R″ represents a monovalent hydrocarbon radical and R‴ represents an aminoalkyl or polyaminoalkyl radical.

7. A process as claimed in claim 6 wheren the organopolysiloxane is a copolymer of dimethylsiloxane units and methyl(γ-aminopropyl)siloxane units.

8. A process as claimed in claim 6 wherein the organopolysiloxane is a copolymer of dimethylsiloxane units and methyl(N - beta-aminoethyl - gamma-aminopropyl) siloxane units.

References Cited

UNITED STATES PATENTS

| 2,894,913 | 7/1959 | Sullivan et al. | 252—321 |
| 3,113,930 | 12/1963 | Chevalier | 252—358 |
| 3,234,144 | 2/1966 | Morehouse | 252—389 |
| 3,249,535 | 5/1966 | Keil | 252—8.3 |
| 3,265,623 | 8/1966 | Pines et al. | 252—389 X |

FOREIGN PATENTS

| 914,460 | 1/1963 | Great Britain. |

LEON D. ROSDOL, *Primary Examiner.*

H. B. GUYNN, *Assistant Examiner.*